United States Patent [19]

Kitaoka et al.

[11] Patent Number: 4,591,238
[45] Date of Patent: May 27, 1986

[54] MOVIE PROJECTOR PENDANT

[75] Inventors: Teruhiko Kitaoka; Hajime Matsumoto, both of Chiba, Japan

[73] Assignee: Toybox Corporation, Tokyo, Japan

[21] Appl. No.: 503,537

[22] Filed: Jun. 13, 1983

[51] Int. Cl.⁴ .......................................... G03B 21/00
[52] U.S. Cl. ............................... 353/122; 353/43; 353/DIG. 2; 352/129; 40/364
[58] Field of Search ................... 40/362–364, 40/366, 367; 352/126, 128, 129; 353/DIG. 2, 43, 122, 119

[56] References Cited

U.S. PATENT DOCUMENTS

| 1,364,278 | 1/1921 | Hochstetter | 353/97 |
| 2,122,804 | 7/1938 | Tichenor | 352/129 |
| 2,432,200 | 12/1947 | Lasky et al. | 352/128 |
| 2,449,483 | 9/1948 | Iwick | 352/129 |
| 3,159,077 | 12/1964 | Hoag et al. | 353/95 |
| 3,473,870 | 10/1969 | Platt | 353/DIG. 2 X |
| 3,756,706 | 9/1973 | Klynn | 352/128 X |
| 4,249,330 | 2/1981 | Chioffe | 40/363 |

FOREIGN PATENT DOCUMENTS

| 935187 | 2/1948 | France | 352/129 |
| 692907 | 9/1950 | United Kingdom | 352/129 |

Primary Examiner—Harry N. Haroian
Attorney, Agent, or Firm—Staas & Halsey

[57] ABSTRACT

A miniature movie projector for viewing a continuous loop movie film in ambient light is disclosed. A hand operated spring mechanism moves the continuous loop movie film such that ambient light entering the projector enables the movie to be viewed. The projector is constructed such that it can be worn as a pendant.

2 Claims, 9 Drawing Figures

MOVIE PROJECTOR PENDANT

BACKGROUND OF THE INVENTION

This invention is directed to an amusement device for viewing movies. More particularly, the invention relates to a self-contained movie projector for viewing a movie film housed in the projector. The projector can be worn as an ornament.

SUMMARY OF THE INVENTION

It is an object of the present invention to provide an amusement device which is attractive in appearance.

It is another object of the present invention to provide a self-contained movie projector which is small in size, and which can be worn as an ornament.

It is a further object of the present invention to provide a miniature movie projector which is easy to operate.

Still another object of the present invention is to provide a miniature movie projector capable of supplying a movie using ambient light.

A further object of the present invention is to provide a miniature movie projector capable of displaying a continuous loop movie film.

To achieve the foregoing objects, the amusement device of the present invention comprises a housing, a continuous loop movie film contained within the housing, a lens system mounted on the housing for viewing the continuous loop movie film, and a mechanism for moving the continuous loop movie film past the lens system, thus enabling the movie to be viewed.

In a preferred embodiment of the amusement device of the present invention, a miniature housing is provided to house both a continuous loop movie film and a spring mechanism for moving the continuous loop movie film. The spring mechanism moves the continuous loop movie film past a lens system mounted within the housing, thus enabling the movie to be viewed. The spring mechanism is actuated by pulling a cord attached thereto through an aperture provided in the housing. To enable the amusement device to be worn as an ornament, an additional cord is attached to the housing such that the amusement device can be worn as a pendant.

Finally, it is preferred that various attractive decorations be placed on the housing of the miniature movie projector, e.g., decorative moldings, pictures or the like.

BRIEF DESCRIPTION OF THE DRAWINGS

The accompanying drawings, which are incorporated in and constitute part of the specification, illustrate an embodiment of the present invention, and together with the description, serve to explain the principles of the invention.

DETAILED DESCRIPTION OF THE PREFERRED EMBODIMENT

Figure 1:
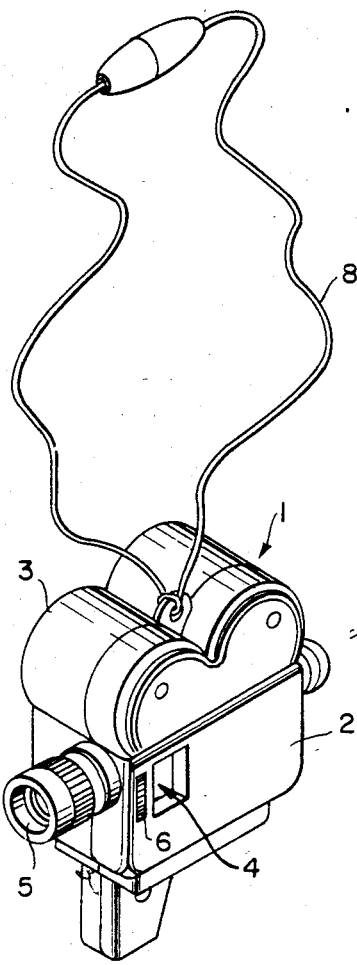
FIG. 1 is a perspective view of a preferred embodiment of the movie projector of the present invention.

FIG. 1 illustrates a preferred embodiment of the movie projector amusement device of the present invention. As illustrated, the movie projector includes a housing 1 having a first half 2 and a second half 3 for positioning and mounting the individual elements of the movie projector. The light entrance port 4 allows light to pass through a portion of the first half 2 and illuminate the continuous loop movie film positioned within the housing 1.

Figure 2:
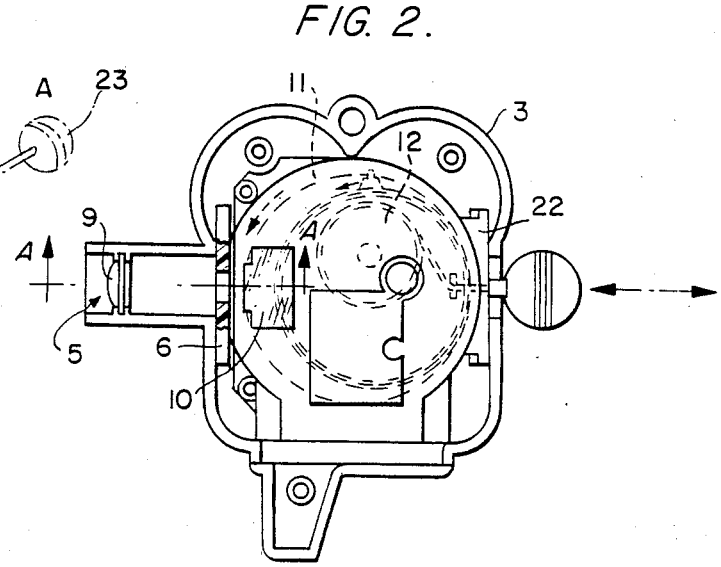
FIG. 2 is a cross-sectional view of the movie projector shown in FIG. 1, illustrating the major components of the film movement system.

To operate the movie projector, the cord 7 is pulled to the position shown in FIG. 1. Pulling the cord 7 winds the spring mechanism 12 shown in FIG. 2. Referring to FIG. 2, upon release of the cord 7, the spring mechanism 12 causes the continuous loop movie film 11 to be moved in the direction of the arrows, so that light passing through the entrance port 4 is reflected by the mirror 10 and passes through the film 11 toward lens 9 and out viewing port 5.

The framing adjustment 6 comprises a planar opaque material having a window formed therein. The framing adjustment 6 is mounted such that a viewer can slide the framing adjustment 6 relative to the housing, and obtain proper framing of the continuous loop movie film 11. When not being operated as a movie projector, the cord 8 shown in FIG. 1 enables the movie projector of the present invention to be worn as a pendant.

Figure 3:
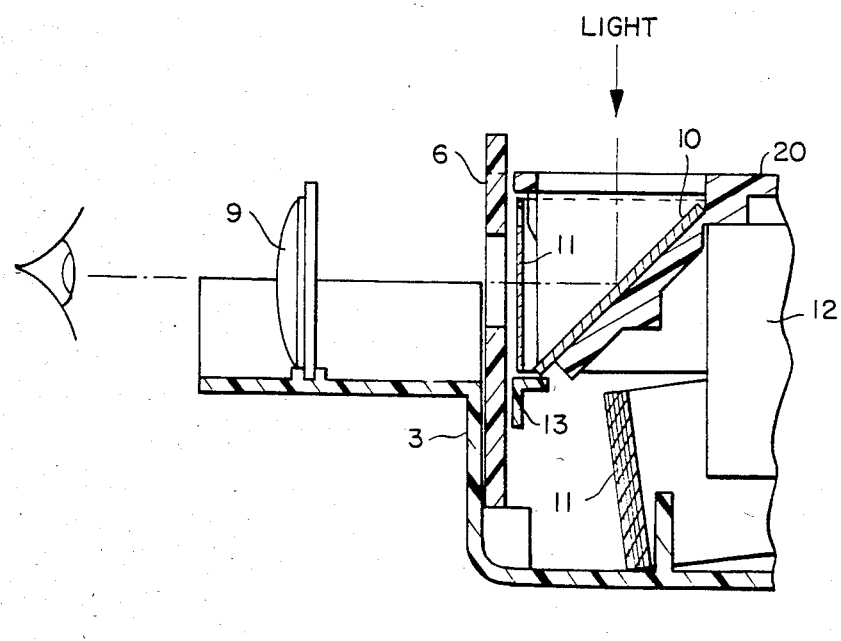
FIG. 3 is a sectional view of the movie projector as illustrated in FIG. 2 taken along the line A—A.

FIG. 3 is a sectional view of the movie projector taken along line A—A of FIG. 2. To enable the continuous loop movie film to be viewed, light passing through the light entrance port 4 is reflected by the mirror 10 and then passes through the film 11. The mirror 10 is mounted on the mounting bracket 20 such that light being reflected from the mirror 10 passes through the film 11, the framing adjustment 6 and the lens 9 in route to the viewer. This light path is shown by the broken line in FIG. 3.

Figure 4:
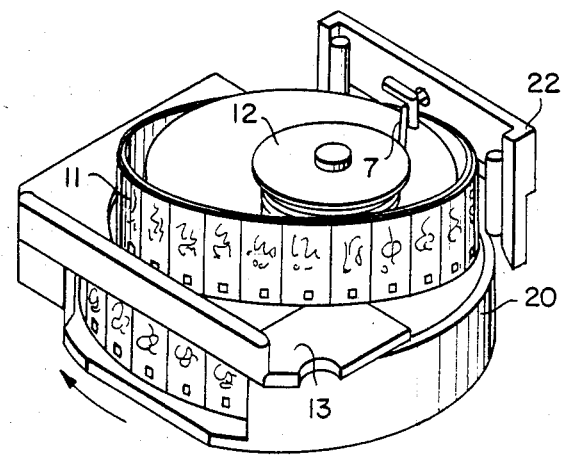
FIG. 4 is a perspective view showing the path of the continuous loop film.
Figure 5:
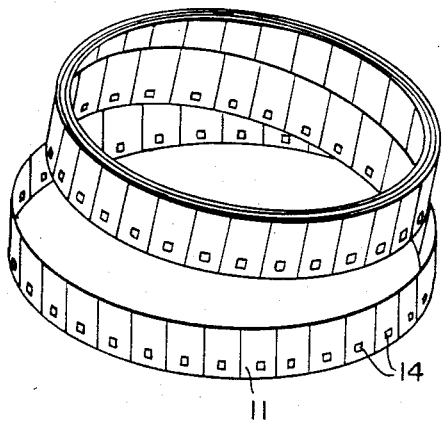
FIG. 5 is a perspective view of the continuous loop film of FIG. 4.

FIG. 4 illustrates the position of the continuous film loop 11 relative to the mounting bracket 20. As seen in FIG. 4, the separator 13 acts to spread the continuous loop movie film into a helix shape. A more detailed view of the helix shape of the continuous loop film is illustrated in FIG. 5. FIG. 4 also illustrates the cord guide 22 which is mounted on the mounting bracket 20. Cord guide 22 functions to guide the cord 7 to and from the spring mechanism 12, and to stop the movement of the cord when the stopper 23 (shown in FIG. 1) contacts the cord guide 22.

Figure 8:
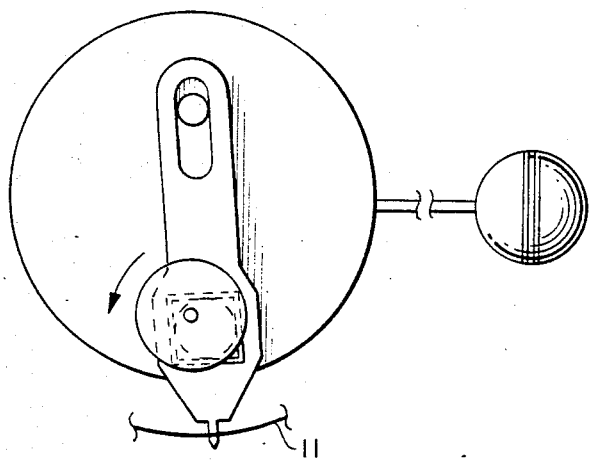
FIGS. 7 and 8 are top plan views and illustrate the operation of the film movement apparatus shown in FIG. 6.
Figure 6:
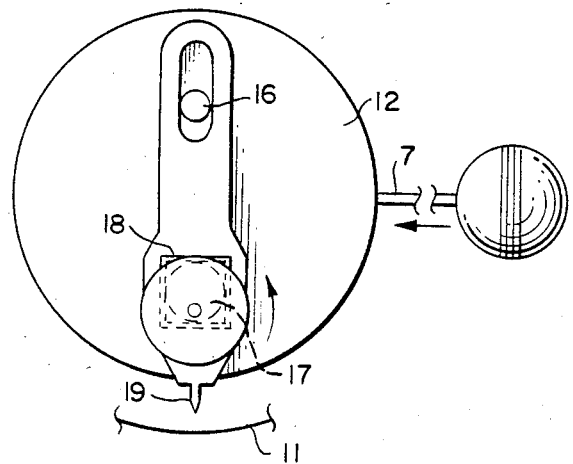
FIG. 6 is a top plan view of the film movement apparatus of the present invention.
Figure 7:
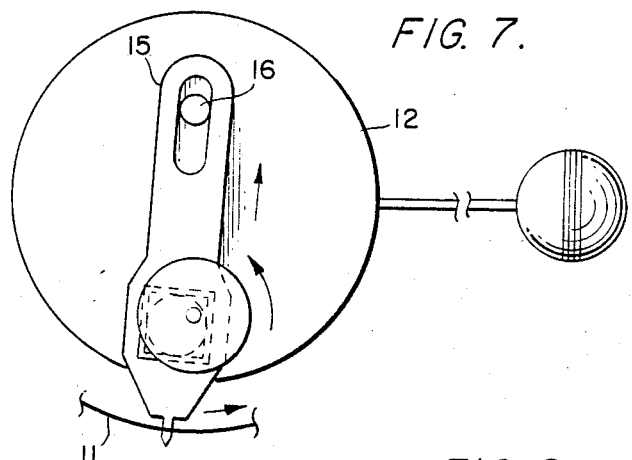
Figure 9:
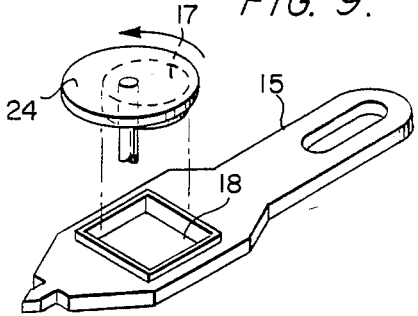
FIG. 9 is a perspective view of the cam and sprocket arm of the film movement apparatus illustrated in FIG. 6.

FIG. 6 illustrates the relative positions of the elements of the film movement apparatus. This apparatus comprises the spring mechanism 12, the guide pin 16 mounted on the spring mechanism 12, cam 17, and the sprocket arm 15 slidably mounted on both the guide pin 16 and cam 17. FIG. 9 illustrates the cam 17 and sprocket arm 15 in detail. When these elements are mounted as shown in FIG. 6, the cam 17 is positioned in the window 18 formed in the sprocket arm 15. Consequently, as the cam slidably rotates against the walls of the window 18, the sprocket tip 19 is moved in a generally rectangular path. FIG. 6 illustrates the position of the sprocket arm 15 with respect to the guide pin 16 and cam 17 when the sprocket arm 15 is at the furthest distance from the continuous loop movie film 11. As the cam 17 rotates in a clockwise direction from the position shown in FIG. 6, the sprocket tip 19 moves in a counterclockwise direction to engage the continuous loop film 11 as shown in FIG. 7. Once the sprocket tip 19 engages the continuous loop film 11, further clockwise motion of the cam 17 causes the sprocket tip 19 to move the continuous loop film 11 in a clockwise direction as shown in FIGS. 7 and 8. Since the cam 17 is rotated by the spring mechanism 12, the speed at which the cam 17 rotates and hence the speed at which film is transported past the mirror 10, is governed by the spring mechanism 12.

We claim:

1. A minature amusement device for viewing a continuous loop movie film including a series of frames, comprising:

a housing having a light entrance port positioned in a first side of the housing, an access port and a light exit port positioned in a second side of the housing adjacent to the first side, and having a substantially cylindrical portion formed therein;

a continuous loop movie film positioned within the substantially cylindrical portion of said housing such that said film forms a helix with all of the film being within the substantially cylindrical portion;

a mirror mounted within said housing and positioned within said helix of film in a manner so as to form a light path between said light entrance port and said light exit port such that a portion of said film traverses said light path;

a lens system mounted within a portion of said housing outside said cylindrical portion and within said light path;

drive means mounted within said housing and positioned along the longitudinal axis of and within said helix of film, for moving said part of said film through said light path, said drive means including:
 a spring mechanism;
 a cord operatively connected to said spring mechanism and extending outwardly from said housing, such that said spring mechanism is wound as said cord is pulled,
 a cam mounted on and rotated by said spring mechanism;
 a guide pin mounted on said spring mechanism; and
 a sprocket arm slidably mounted on said cam and said guide pin for engaging and moving the continuous loop movie film through the light path in accordance with the rotation of said cam; and framing means, having a slot formed therein and a protuberance and being slidably mounted within said housing and outside said cylindrical portion such that said protuberance slidably engages said access port in said housing and said slot is positioned within said light path, for selectively viewing said portion of the continuous loop movie film traversing the light path by sliding said protuberance within said access port to enable said series of frames to be viewed.

2. An amusement device as in claim 1, further comprising a second cord attached to said housing so that said housing can be worn as an ornament.

* * * * *